June 21, 1927.
P. RAIMER ET AL
1,633,273
POWER TAKE-OFF DEVICE FOR TRACTORS
Filed March 31. 1924
2 Sheets-Sheet 1
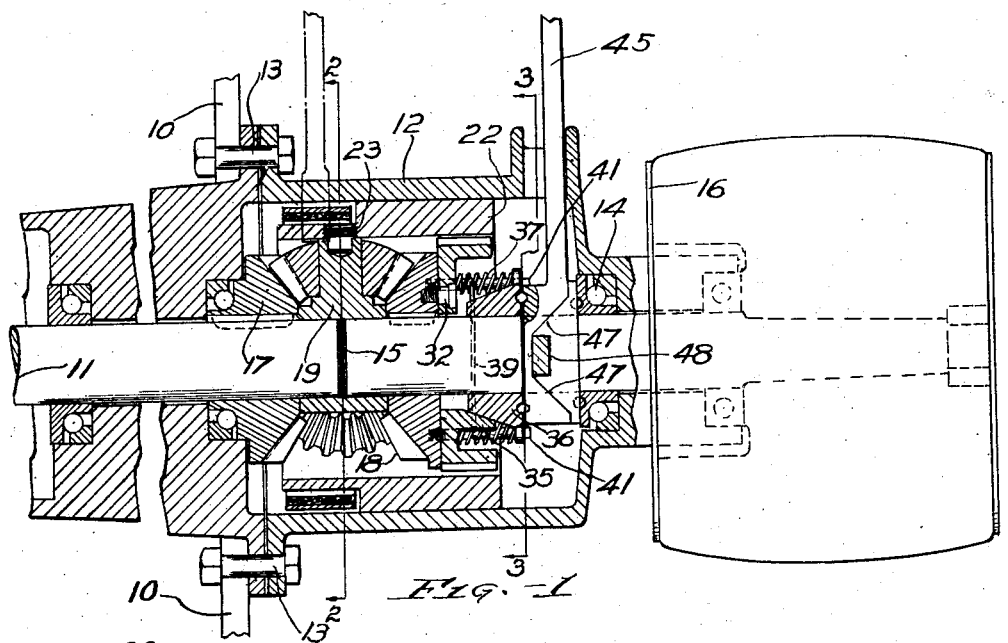
Fig. 1
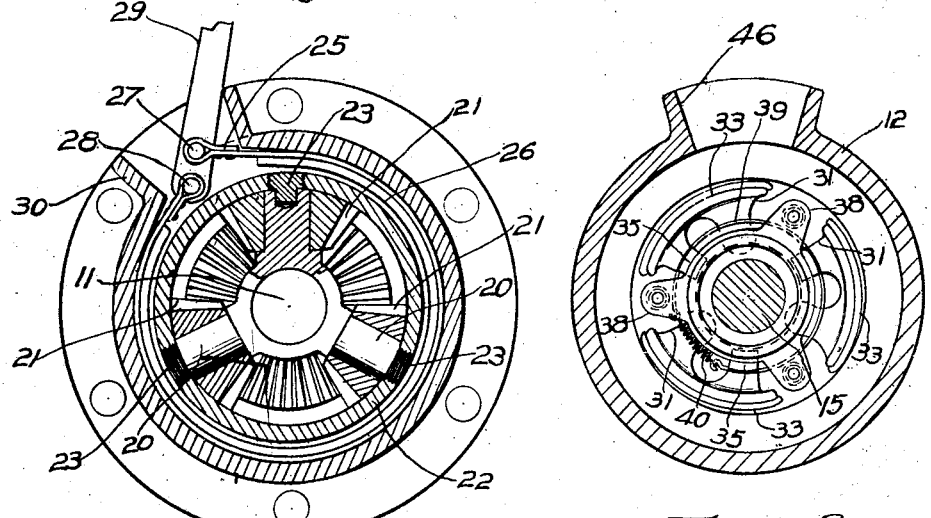
Fig. 2
Fig. 3
INVENTORS
Philip Raimer
Joseph B. Raimer
Edward A. Rolfs
By Baker, Mochlin, Goldrick & Fears, Attys.

June 21, 1927.

P. RAIMER ET AL 1,633,273

POWER TAKE-OFF DEVICE FOR TRACTORS

Filed March 31. 1924    2 Sheets-Sheet 2

Patented June 21, 1927.

1,633,273

UNITED STATES PATENT OFFICE.

PHILIP RAIMER, JOSEPH B. RAIMER, AND EDWARD A. ROLFS, OF MAPLE HEIGHTS, OHIO.

POWER TAKE-OFF DEVICE FOR TRACTORS.

Application filed March 31, 1924. Serial No. 703,040.

Numerous tractors now in use have a removable pulley attachment, positively geared with the engine and projecting beyond one side of the tractor, for receiving a belt to permit operation of machinery by the tractor engine. Usually the driven shaft on which the pulley is mounted is geared to the engine drive shaft between the engine, and the transmission mechanism, wherefore the pulley is constantly operated in one direction so long as the engine is in operation. It is often desirable, however, either to stop the pulley without stopping the engine, and also to reverse the direction of rotation of the pulley without stopping the engine.

One of the objects of our invention therefore is the provision of mechanism which may be employed for selectively controlling the operation of a driven shaft from a constantly rotating drive shaft. In this connection our invention contemplates the provision of mechanism which is especially adapted for use on tractors, and is moreover directed toward the provision of a selective control device which may be housed in a compact casing, to permit adaptation to the side of a tractor frame.

The means for carrying out our invention will hereinafter be fully set forth in the following description which pertains to the accompanying drawings, while the essential characteristics will be summarized in the claims.

Figure 4:
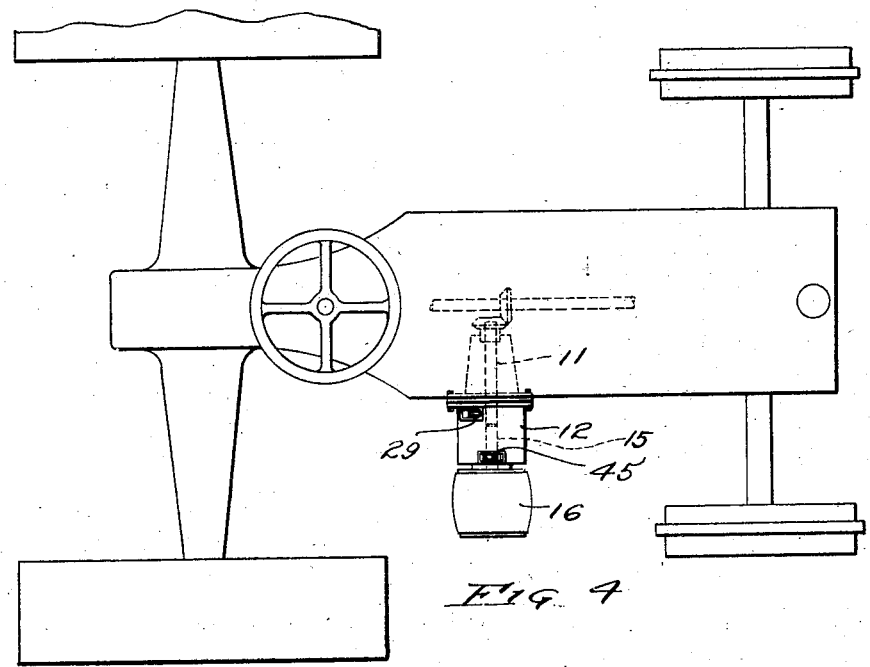
Figure 5:
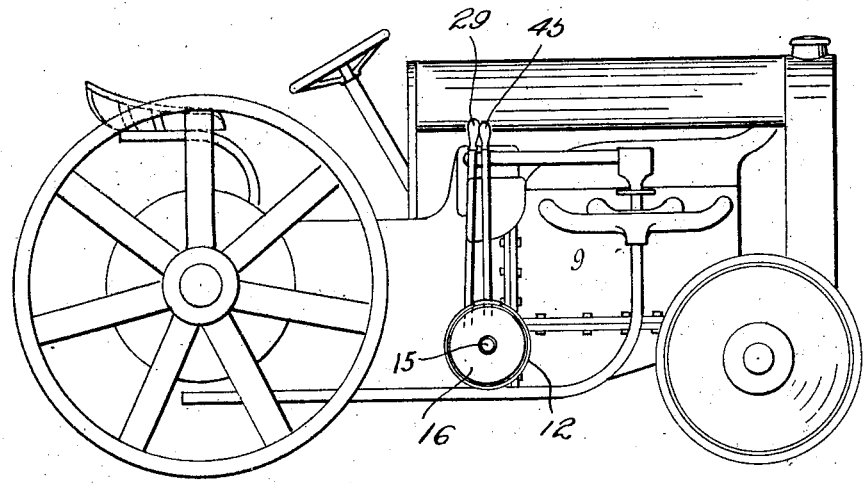

In the drawings, Fig. 1 is a cross-section through a portion of a tractor frame showing a driving and driven shaft together with a pulley attachment and illustrating our invention associated therewith; Fig. 2 is a section taken on the line 2—2 in Fig. 1; Fig. 3 is a section taken on the line 3—3 in Fig. 1; Fig. 4 is a plan view showing a portion of a tractor and illustrating the pulley attachment on the side of the tractor; and Fig. 5 is a side elevation of the mechanism shown in Fig. 4.

Our invention is well adapted for use in selectively controlling the operation of a driven shaft from a constantly operating drive shaft. In the preferred embodiment, however, we have illustrated it in connection with a tractor, the frame of which is indicated in general at 10. This frame supports a driving shaft 11 which is arranged to be positively driven from the tractor engine indicated at 9. As shown the driving shaft 11 projects beyond the side of the frame and into a housing 12 which may be attached to the frame by securing members 13. Journalled within the housing, as at 14, we have shown a driven shaft 15 which projects beyond the housing and is provided at the outer end thereof with a pulley wheel 16.

Our invention is concerned with mechanism for selectively controlling the operation of the driven shaft while the driving shaft is constantly rotating. To this end we employ a bevel gear 17 which is rigidly mounted on the shaft 11, outside the frame 10, and near the end of the shaft. We have also shown a similar bevel gear 18 which is rigidly mounted on a shaft 15 and near the end thereof. A spider 19 is shown disposed between the gears 17 and 18 and may be supported partially on each shaft. We have shown the spider as having arms 20 extending radially therefrom, which arms support pinions 21, which mesh with the gears 17 and 18 respectively. A drum 22 is disposed within the housing and is adapted to be rigidly connected to each arm 20, as by securing members 23.

The mechanism heretofore described is adapted to permit constant operation of the drive shaft without effecting rotation of the driven shaft. For example, if a load is placed on the pulley 16 so as to overcome friction between the operating parts of the control mechanism, then as the gear 17 is rotated the pinions 21 are rotated. Since the load on the pulley wheel is sufficiently great to prevent rotation of the gear 18, and since the drum 22 is rigid with each post 20, then such drum is caused to rotate while the pinions revolve about the axis of the shaft. In other words, the mechanism functions in a manner similar to a differential gear mechanism, wherein one driven shaft is maintained stationary, while the other is permitted to rotate.

To cause actuation of the pulley wheel 16, we provide means for holding the spider 19 which causes the pinions to rotate about their respective axes without revolving and thereby to rotate the gear 18. The preferred means for stopping the rotation of the spider is illustrated as a brake band 25 which carries a lining 26, and which is operatively connected at 27 and 28 respectively to an arm 29. This arm projects through an opening 30 in the housing in such position as to be accessible for actuation. When the arm 29 is actuated to set the brake, then rotation of the drum is stopped, wherefore the pinions cause the gear 18 to rotate in a direction opposite to that of the gear 17. Thus if the gear 17 is rotating and the brake is not set, then the drum 22 rotates without rotating the pulley 16. On the other hand if the drum is locked against rotation, by setting the brake on the outer surface of the drum, then the gear 18 is caused to rotate in a direction opposite to the direction of rotation of the gear 17.

To cause the gear 18 to rotate in the same direction as the gear 17, and thereby to rotate the pulley in the same direction as the drive shaft 11, we provide selectively operable mechanism for connecting the drum 22 with the gear 18, wherefore the gear 17, spider 19, drum 22, and gear 18 may be locked together and rotated as a unit. The preferred mechanism for accomplishing this embodies a friction connection, as illustrated by a plurality of spaced shoes 31, which are pivotally mounted at 32 on the back of the gear 18, and are provided with facings 33 which are adapted to engage the inner surface of the drum.

To actuate the shoes 31 and thereby to effect a driving connection between the drum and the gear 18, we have shown each shoe as having a tapered lug 35 adjacent the free end thereof. These lugs are adapted to be simultaneously engaged by a conical member 36, which is rotatable with the gear 18. We prefer to connect the member 36 with the gear 18 by pins 41 each of which is rigidly mounted in the gear and is slidably mounted in an ear 38 on the member. The conical member and the tapered portions 35 of the shoes therefore, coact to provide a clutch, which when actuated forces the lining 33 into engagement with the inner surface of the drum. The clutch member 36 is normally maintained out of engagement with the shoes by spaced coil springs 37, each having one end thereof engaging the back of the gear 18 and the other end thereof engaging an ear 38.

The shoes are normally prevented from being forced into engagement with the drum by centrifugal force, preferably by a split band 39 which extends around the lugs and is yieldably connected by a spring 40.

To move the conical member 36 against the force of the springs 37 so as to set the shoes against the drum we have shown a shipper lever 45 which extends through an opening 46 in the housing and is loosely mounted on the shaft 15. The hub of the lever may have an inclined peripheral surface 47 which is adapted to engage a block 48 and to function as a cam for urging the cone 36 along the shaft. The pitch of the cam surface 47 is such that a slight oscillatory movement of the shipper lever is sufficient to throw the cone inwardly against the force of the springs 37.

Assuming that the shaft 11 is constantly rotating in one direction and that there is sufficient load on the pulley wheel 16 to overcome the friction of the moving parts, then if both outer and inner brakes on the drum 22 are released, the spider 19 will rotate, and the pinions 21 carried thereby will also rotate on their respective axes without imparting motion to the gear 18. Accordingly when both brakes are released the shaft 11 may rotate without imparting rotation to the shaft 15. To rotate the pulley wheel in a direction opposite to the direction of rotation of the shaft 11, the brake controlled by the arm 29 is set. This holds the spider 19 in stationary position wherefore the pinions 21 cause the gear 18 to rotate in a direction opposite to that of the gear 17. To cause the pulley wheel to rotate in the same direction as the shaft 11, the brake controlled by the arm 29 is released and that controlled by the shipper lever 45 is set. This locks the gear 18, drum 22, spider 19 and gear 17 as a unit wherefore the shaft 15 is caused to rotate in the same direction as the shaft 11.

An advantage of a device made in accordance with our invention is the adaptability for use with existing tractors and the ease by which the operation of the pulley wheel may be controlled from a constantly rotating drive shaft. A further advantage of our invention is the compact arrangement of the control mechanism which permits the installation thereof in a small space.

Having thus described our invention, we claim:

1. The combination with a tractor frame having an opening therein, of a housing having a cylindrical interior removably secured to the frame adjacent the opening, a driving shaft, an aligned driven shaft mounted in the housing, a reversing mechanism connecting the driving and driven shafts and comprising gears on each of them, an axially rotatable member between the gears carrying pinions meshing with them, a sleeve carrying said rotatable member journalled in the cylindrical interior of the housing, and a brake band operating in a recess in the sleeve.

2. The combination with a tractor frame having an opening therein, a housing secured to the frame opposite the opening, a driving shaft projecting into the housing, an aligned driven shaft in the housing projecting beyond the same, said housing having a cylindrical interior, a sleeve journalled therein, a spider connected with the sleeve carrying pinions, bevel gears on the driving and driven shafts, respectively, with which such pinions mesh, a brake band coacting with a reduced portion of said sleeve, and a clutch adapted to lock the driven shaft to said sleeve.

3. In combination with a tractor frame having an opening therein, a housing secured to the frame opposite the opening, a driving shaft projecting into the housing, and an aligned driving shaft in the housing projecting beyond the same, said housing having a cylindrical interior, a sleeve journalled therein, a spider connected with the sleeve and carrying pinions, bevel gears on the driving and driven gears respectively with which said pinions mesh, said sleeve having a reduced portion at one end forming a recess between the cylindrical interior and the sleeve, and a brake band positioned in said recess and retained in place thereby, said band being arranged to cooperate with the sleeve to lock the sleeve to the housing, and a lever extending through the wall of the housing and having a connection with each end of the brake band whereby the brake band supports the lever.

In testimony whereof we hereunto affix our signatures this 19th day of March, 1924.

PHILIP RAIMER.
JOSEPH B. RAIMER.
EDWARD A. ROLFS.